United States Patent [19]

Otsuka et al.

[11] Patent Number: 5,714,719
[45] Date of Patent: Feb. 3, 1998

[54] WORKLOAD DETECTING SYSTEM FOR EXCAVATING AND LOADING APPARATUS

[75] Inventors: Kazuo Otsuka; Kunihiko Imanishi; Kenzo Kimoto; Minpei Shoda, all of Osaka-fu, Japan

[73] Assignee: Kabushiki Kaisha Komatsu Seisakusho, Tokyo, Japan

[21] Appl. No.: 351,281

[22] PCT Filed: Jun. 25, 1993

[86] PCT No.: PCT/JP93/00870

§ 371 Date: Dec. 23, 1994

§ 102(e) Date: Dec. 23, 1994

[87] PCT Pub. No.: WO94/00740

PCT Pub. Date: Jan. 6, 1994

[30] Foreign Application Priority Data

Jun. 26, 1992 [JP] Japan .................. 4-191407

[51] Int. Cl.⁶ .................. G01G 19/22; G01G 19/10
[52] U.S. Cl. .................. 177/25.11; 177/141
[58] Field of Search .................. 177/141, 25.11

[56] References Cited

U.S. PATENT DOCUMENTS

| | | | |
|---|---|---|---|
| 4,230,196 | 10/1980 | Snead | 177/141 |
| 4,499,960 | 2/1985 | Ehrich et al. | 177/25.11 |
| 4,627,013 | 12/1986 | Ichiyama et al. | 177/141 X |
| 4,995,468 | 2/1991 | Fukuda | 177/139 |
| 5,070,953 | 12/1991 | Krytsos et al. | 177/141 |
| 5,105,895 | 4/1992 | Krytsos et al. | 177/141 |
| 5,250,761 | 10/1993 | Koyanagi | 177/141 |

FOREIGN PATENT DOCUMENTS

| | | |
|---|---|---|
| 0 305 154 | 3/1989 | European Pat. Off. . |
| 0 334 959 | 10/1989 | European Pat. Off. . |
| 2312006 | 9/1973 | Germany . |
| 59-102021 | 6/1984 | Japan . |
| 59-107217 | 6/1984 | Japan . |
| 59-153934 | 9/1984 | Japan . |
| 59-206535 | 11/1984 | Japan . |
| 60-82595 | 5/1985 | Japan . |
| 60-102436 | 6/1985 | Japan . |
| 60-141930 | 7/1985 | Japan . |
| 61-8832 | 1/1986 | Japan . |
| 61-40455 | 3/1986 | Japan . |
| 64-57127 | 3/1989 | Japan . |
| 4-31139 | 2/1992 | Japan . |

*Primary Examiner*—Michael L. Gellner
*Assistant Examiner*—Randy W. Gibson
*Attorney, Agent, or Firm*—Wenderoth, Lind & Ponack

[57] ABSTRACT

A workload detecting system for an excavating and loading apparatus, in which a bucket supporting member is vertically pivoted relative to a vehicle body and a bucket is actuated to be tilted with respect to the bucket supporting member. The system includes a bottom pressure detecting system (17) for detecting a bottom pressure of a cylinder (6) for vertically pivoting the bucket supporting member (5, 7), a bucket earth and sand amount calculating system (18) for calculating an earth and sand weight within the bucket (9) on the basis of the detected bottom pressure, and a bucket earth and sand amount calculating summing system (31) for integrating the calculated bucket earth and sand weight.

42 Claims, 4 Drawing Sheets

15-BUCKET POSITION DETECTING PORTION
18-BUCKET EARTH AND SAND AMOUNT CALCULATING PORTION
26-FUEL CONSUMPTION CALCULATING PORTION
31-SUMMING CIRCUIT

WORKLOAD DETECTING SYSTEM FOR EXCAVATING AND LOADING APPARATUS

FIELD OF THE INVENTION

The present invention relates to a workload detecting system for an excavating and loading apparatus having a bucket, such as a power shovel, wheel loader and so forth.

BACKGROUND ART

Excavation and transportation work in a civil engineering site, is generally done by loading earth and sand into a dump truck by means of an excavating and loading apparatus and to transport the loaded earth and sand by the dump truck. While it depends on the transporting distance by the dump truck, such excavating and transporting operations are typically done by a combination of five to six dump trucks and one excavating and loading apparatus so that the excavating and loading apparatus may continuously perform excavating and loading operation without resting.

On the other hand, when excavating and transporting portions of earth and sand, it is important for the management of an operation to know the amount of earth and sand transported per day. Therefore, in the conventional earth and sand transporting amount calculating system, a loading amount measuring device is installed on each dump truck, to detect a load amount and a daily earth and sand transporting amount is calculated by summing the loading amount.

Therefore, in the conventional earth and sand transporting amount calculating system, a large number of loading amount measuring devices corresponding to the number of the dump trucks becomes necessary and causes high cost.

Therefore, it is an object of the present invention to provide a workload detecting system for an excavating and loading apparatus which can detect the workload of the excavating and loading apparatus. The workload detecting system permits calculation of a daily earth and sand transporting amount without providing load amount measuring devices for each dump truck and as such provides the earth and sand transporting amount calculating system at low cost.

DISCLOSURE OF THE INVENTION

In order to accomplish the above-mentioned and other objects, in accordance with the present invention, a workload detecting system for an excavating and loading apparatus is disclosed. The excavating and loading apparatus includes a bucket supporting assembly which is vertically pivoted relative to a vehicle body and a bucket is actuated to be tilted with respect to the bucket supporting assembly. The apparatus includes a bottom pressure detecting gauge for detecting a bottom pressure of a cylinder which vertically pivots the bucket supporting assembly.

A bucket earth and sand amount calculating means for calculating an earth and sand weight within the bucket on the basis of the detected bottom pressure is also included.

Also provided is a bucket earth and sand amount calculating summing means for integrating the calculated bucket earth and sand weight.

With the construction set forth above, the bucket earth and sand weight per operation by the bucket of the excavating and loading apparatus and sum of bucket earth and sand weight in a day can be detected. Therefore, when excavation and transportation of earth and sand is performed by a combination of one excavating and loading apparatus and a plurality of dump trucks, the transported earth and sand weight in a day can be detected without providing expensive load amount measuring devices for respective dump trucks. Accordingly, the earth and sand transporting amount calculating system can be constructed at low cost.

It should be noted that, in the construction set forth above, it is preferred that the workload detecting system for an excavating and loading apparatus also includes a dump actuation detecting means.

The dump actuation detecting means detects actuation of a dump of the bucket. The bucket earth and sand amount calculating means calculates the bucket earth and sand weight from an average value of the bottom pressure detected at timings slightly before and after a predetermined period from a given timing which is set at a given period ahead of input timing of a dump actuation detection signal.

With the construction set forth above, since the bucket earth and sand weight is derived from the average values of the bottom pressures of the cylinder immediately before actuation of dump operation of the bucket, variation of the bottom pressure due to variation of the excavation load can be avoided so that bucket earth and sand weight can be accurately detected.

Also, the workload detecting system for an excavating and loading apparatus preferably includes a bucket position data detecting means for detecting data relating to a position of the bucket and a bucket position calculating means for calculating a bucket position on the basis of the detected bucket position data.

The bucket earth and sand amount calculating means corrects the bucket earth and sand weight on the basis of the calculated bucket position.

With this construction, since a relationship between the bottom pressure and the bucket earth and sand weight is corrected on the basis of the calculated bucket position, the bucket earth and sand weight can be accurately detected irrespective of the bucket position even when the bottom pressure is varied depending upon the bucket position.

The workload detecting system for an excavating and loading apparatus preferably includes a tilt angle detecting means for detecting tilt angle of the vehicle body, where the bucket position calculating means corrects the bucket position on the basis of the detected tilt angle of the vehicle body.

With this construction, since the bucket position can be corrected on the basis of the vehicle body tilt angle, the bucket earth and sand weight can be accurately detected even when the bottom pressure is varied depending upon the tilting of the vehicle body.

It is also preferable that the workload detecting system for an excavating and loading apparatus includes a calculation interruption signal input means for inputting a signal for interrupting calculation of the bucket earth and sand weight.

With this construction, since the calculation of the bucket earth and sand weight can be interrupted when auxiliary operation other than loading is performed by the bucket, the sum of the bucket earth and sand weight, such as the transported earth and sand weight in a day, can be accurately detected.

Also, an IC memory card ejectably inserted for writing and reading calculated bucket earth and sand weight and an integrated bucket earth and sand weight is further provided.

With this construction, it is advantageous from the viewpoint of the management of an operation to store the bucket earth and sand weight and so forth in the IC memory card and input it to a microcomputer at a different place.

BRIEF DESCRIPTION OF THE DRAWINGS

The present invention will be understood more fully from the detailed description given here below and from the accompanying drawings of the preferred embodiment of the invention, which, however, should not be taken to be limitative to the present invention, but for explanation and understanding only.

In the drawings.

BEST MODE FOR IMPLEMENTING THE INVENTION

The preferred embodiment of a workload detecting system for an excavating and loading apparatus according to the present invention will be discussed hereinafter with reference to FIGS. 1 to 6.

Figure 1:
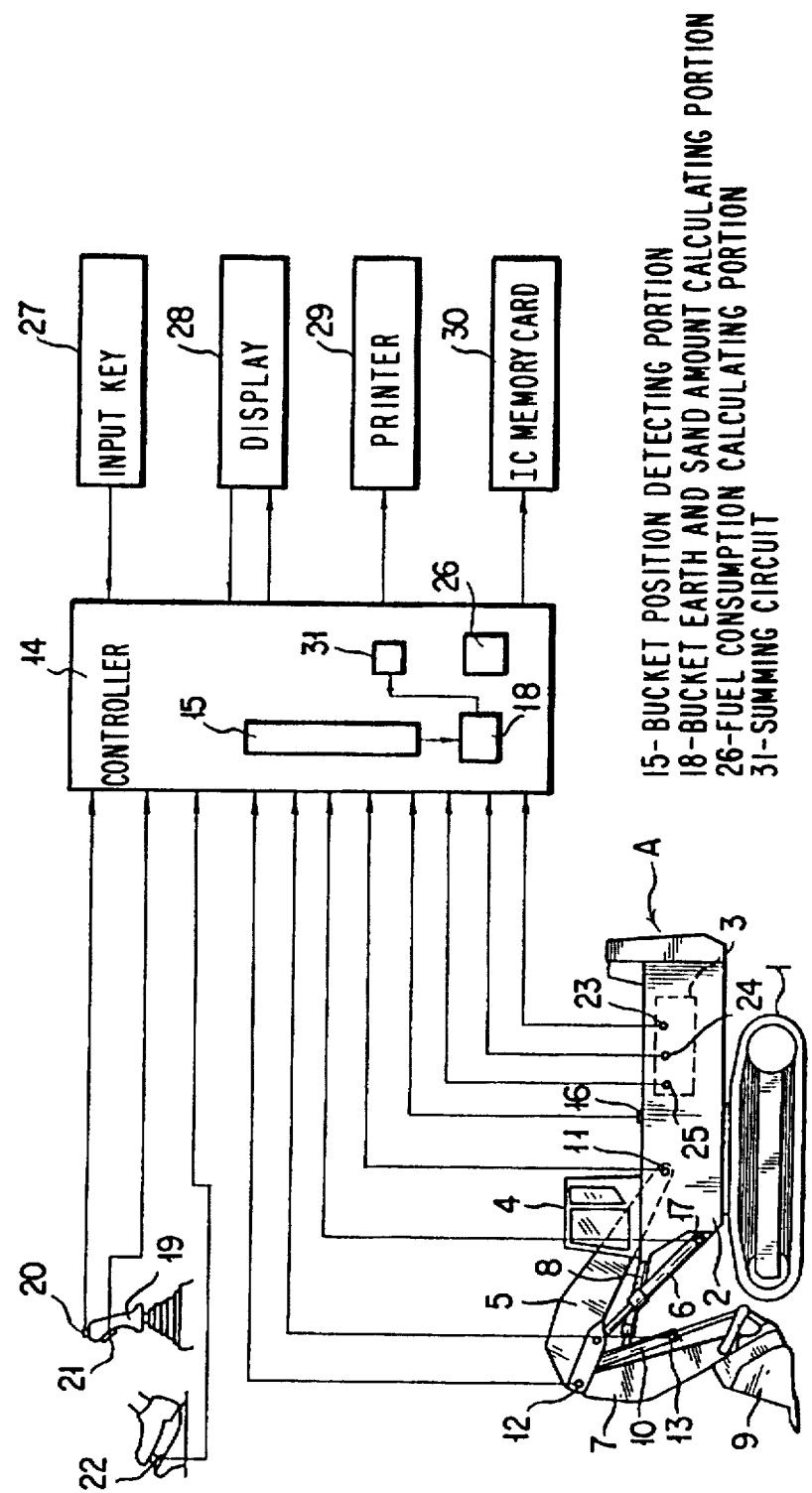
FIG. 1 is an explanatory illustration showing an overall construction of one embodiment of a workload detecting system for an excavating and loading apparatus according to the/present invention.

In FIG. 1, A denotes an excavating and loading apparatus, in which an upper vehicle body 2 is rotatably mounted on a lower traveling body 1. On the upper vehicle body 2, an engine 3 and an operator's cabin 4 are provided. Also, on the upper vehicle body 2, a boom 5 is supported pivotally in the vertical direction. The boom 5 is pivotally driven by a boom cylinder 6. An arm 7 is pivotally supported by the boom 5. The arm 7 is pivotally driven by an arm cylinder 8. On the arm 7, a bucket 9 is mounted in tiltable fashion so as to be driven by a bucket cylinder 10 for tilting operation including dump operation.

On the support shaft of the boom 5, a boom angle gauge 11 for detecting an angle of the boom 5 is provided. Also, on a support shaft of the arm 7, an arm angle gauge 12 for detecting an angle of the arm 7 relative to the boom 5 is provided. On the bucket cylinder 10, a stroke gauge 13 for detecting a stroke of the bucket cylinder 10 is provided. The detected values of these gauges are input to a bucket position detecting portion 15 of a controller 14 for calculation of the bucket position. On the upper vehicle body 2, a vehicle body tilt gauge 16 is provided. The detected value of the vehicle body tilt gauge 16 is input to the bucket position detecting portion 15. The bucket position detecting portion 15 effects correction of the bucket position on the basis of the detected value of the vehicle body tilt gauge.

Figure 2:
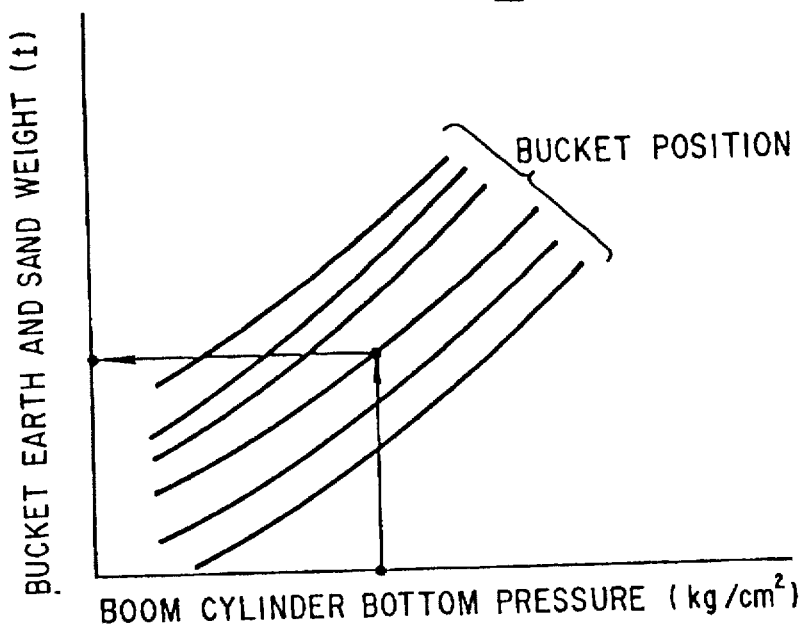
FIG. 2 is a chart showing a relationship between an earth and sand weight in a bucket and a bottom pressure of a boom cylinder, which relationship is variable depending upon a bucket position.

On the bottom of boom cylinder 6, a pressure sensor 17 for detecting a bottom pressure of the boom cylinder 6 is provided. The detected value of the sensor 17 is input to a bucket earth and sand amount calculating portion 18 of the controller 14. In the bucket earth and sand amount calculating portion 18, on the basis of the detected boom cylinder bottom pressure and the bucket position input from the bucket position detecting portion 15, a bucket earth and sand amount is calculated. In this case, as shown in FIG. 2, the calculation is performed utilizing a map showing relationships between the bucket earth and sand amount and the boom cylinder bottom pressure, which relationship is variable depending upon the bucket position. Also, the result of calculation is input to a bucket earth and sand amount summing portion 31 and summed sequentially in the summing circuit 31.

Within the operator's cabin 4, an operation lever 19 is provided. By operating the operation lever 19 in the back and forth direction and lateral direction, an operation valve which supplies pressurized fluid to the cylinder, is switched to control the excavating and loading operation.

On the other hand, on the operation lever 19, a count switch 20 for counting the number of dump trucks which have been loaded with earth and sand. It also acts as a horn switch for notifying completion of loading to the dump truck for the driver of the dump truck and a cancel switch 21 for interrupting bucket earth and sand weight measurement. Also, in the operator's cabin 4, a foot type bucket dump switch 22 is provided. Signals of these switches are input to the bucket earth and sand amount calculating portion 18.

For the engine 3, a throttle open angle sensor 23, an engine speed sensor 24 and operating period timer 25 are provided. The signals of these elements are input to a fuel consumption calculating portion 26 of the controller 14.

To the controller 14, an input key 27, a display 28 and a printer 29 are connected. In addition, an IC memory card 30 is provided to be ejectably inserted into the controller.

Next, discussion will be given for detection of the bucket earth and sand weight in the shown embodiment.

Since there is a specific relationship between the bucket earth and sand weight and the boom cylinder bottom pressure, the bucket earth and sand weight can be derived by measuring the boom cylinder bottom pressure by the pressure sensor 17 and performing calculations by the bucket earth and sand amount calculating portion 18.

However, even when the bucket earth and sand weight is the same, the boom cylinder bottom pressure is differentiated depending upon the position of the bucket. Namely, the relationship between the bucket earth and sand weight and the boom cylinder bottom pressure is varied depending upon the bucket position. The calculation is performed on the basis of the map showing the relationship between the bucket earth and sand weight and the boom cylinder bottom pressure, where such relationship is variable depending upon the bucket position as shown in FIG. 2.

At this time, the bucket position calculating portion 15 of the controller calculates the bucket position and corrects the calculated bucket position on the basis of the vehicle body tilt angle, from the vehicle body tilt gauge 16, to input to the bucket earth and sand amount calculating portion 18. Accordingly, the bucket earth and sand weight can be accurately detected irrespective of the bucket position and the vehicle body tilt angle.

Figure 3:
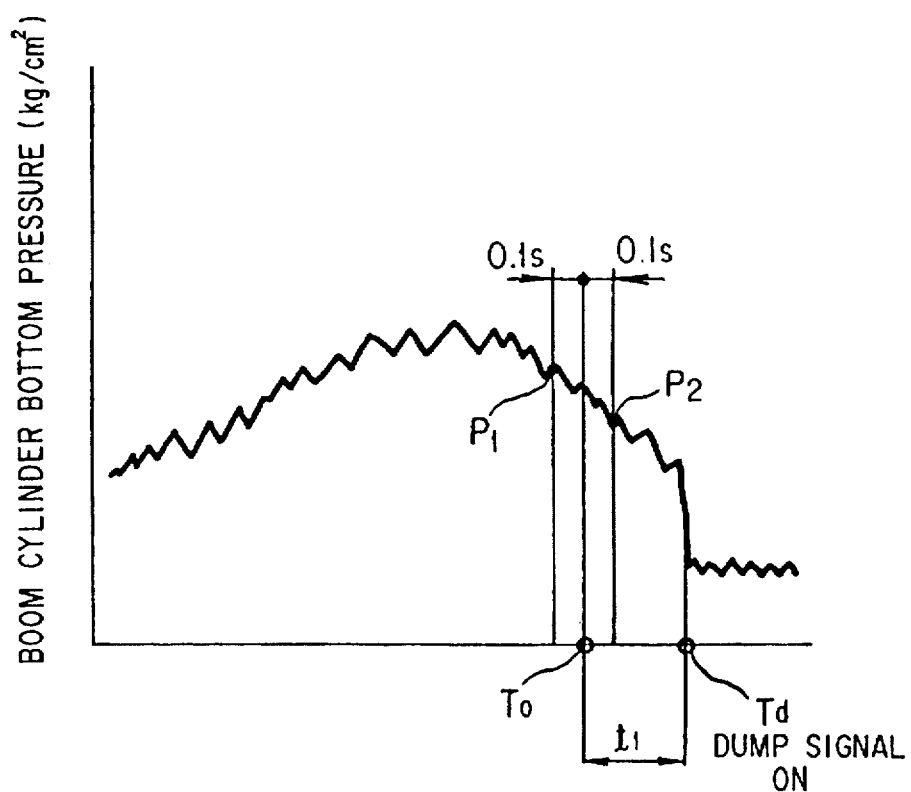
FIG. 3 is a chart showing of variation of the bottom pressure of the boom cylinder.

On the other hand, since the boom cylinder bottom pressure varies, as shown in FIG. 3, depending upon variation of the excavation load and so forth, the shown embodiment assures accurate detection of the bucket earth and sand weight by measuring the boom cylinder bottom pressure at a time immediately before loading to the dump truck.

Namely, as shown in FIG. 3, by continuously measuring the boom cylinder bottom pressure, an average value of pressures $P_1$ and $P_2$ measured at time 0.1 sec. ahead and after a time $T_d$ which is a predetermined period $t_1$ sec. (e.g. 2 sec.) ahead of a timing where the bucket dump signal is input, is taken as the boom cylinder bottom pressure. Then, on the basis of the detected boom cylinder bottom pressure and the calculated bucket position, the bucket earth and sand weight is calculated with reference to the map of FIG. 2.

The calculated bucket earth and sand weight is summed by the summing circuit 31 sequentially. Thus, a grand sum of the earth and sand weight loaded on the dump truck in a day, namely the workload in a day, can be derived.

Thus, without providing expensive loaded amount measuring devices for respective dump trucks, daily transported earth and sand weight can be detected. Accordingly, the earth and sand transportation amount calculating system can be constructed at low cost.

Figure 4:
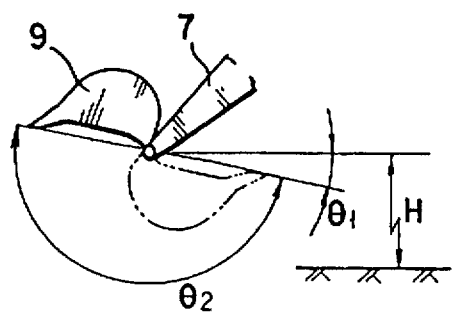
FIG. 4 is an explanatory illustration showing a bucket dump operation.

It should be noted that the bucket dump signal may be replaced with a signal from a dump switch 22. Also, the bucket dump signal may be replaced with a signal corresponding to retraction of the cylinder from the stroke gauge 13 of the bucket cylinder input when the bucket position is higher than or equal to a predetermined height. For instance, as shown in FIG. 4, when the bucket height H is higher than or equal to a set value (variable depending upon the site), and an angle $\theta_1$ is varying to increase and an angle $\theta_2$ is greater than or equal to a set value, the signal from the stroke gauge 13 can be taken as the dump signal.

Also, an electric signal or a hydraulic pressure signal output by the operation lever 19 for switching the operation may be taken as the dump signal.

The excavating and loading apparatus performs an auxiliary operation, such as treatment of footing, treatment of fragment rock and so forth in addition to loading operation to the dump truck. If the foregoing bucket earth and sand weight measurement is performed during such auxiliary operation, the workload cannot be detected precisely. Therefore, upon performing auxiliary operation, the cancel switch 21 is turned ON to input a cancel signal to the controller 14 for interrupting measurement of the bucket earth and sand weight. Thus, the grand sum of the bucket earth and sand weight, e.g. the transported earth and sand weight in a day, can be accurately detected.

Next, when the earth and sand is loaded on the dump truck to make it full, by turning the count switch 20 ON, the signal thereof is input to the controller 14 so that the number of dump trucks loaded with earth and sand can be counted.

Also, upon turning ON this switch, a horn is actuated to give a notice for completion of loading to the driver of the dump truck.

Next, discussion will be given for measurement of fuel consumption of the engine.

Figure 5:
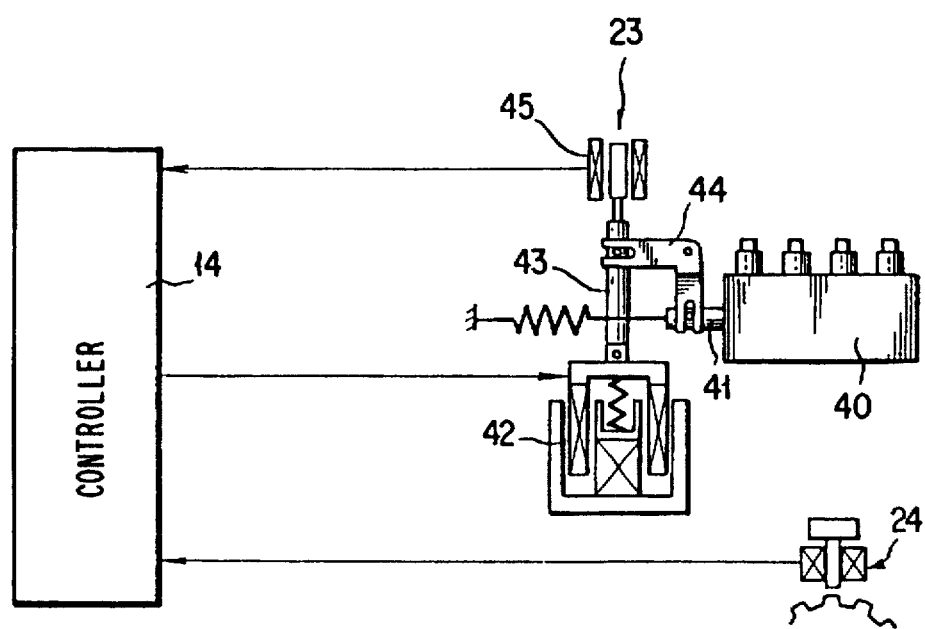
FIG. 5 is an explanatory illustration of a sensor in an engine portion.

As shown in FIG. 5, a fuel injection pump 40 of the engine 3 is designed to control fuel injection amount by shifting a rack 41. The rack 41 is driven to shift by pivotal motion of a lever 44. The lever 44 is pivoted by movement of a rod member 43 which is driven by a moving coil type electromagnetic actuator 42. By providing a differential transducer 45 at the tip end of the rod member 43, a throttle open angle sensor 23 is constructed.

Figure 6:
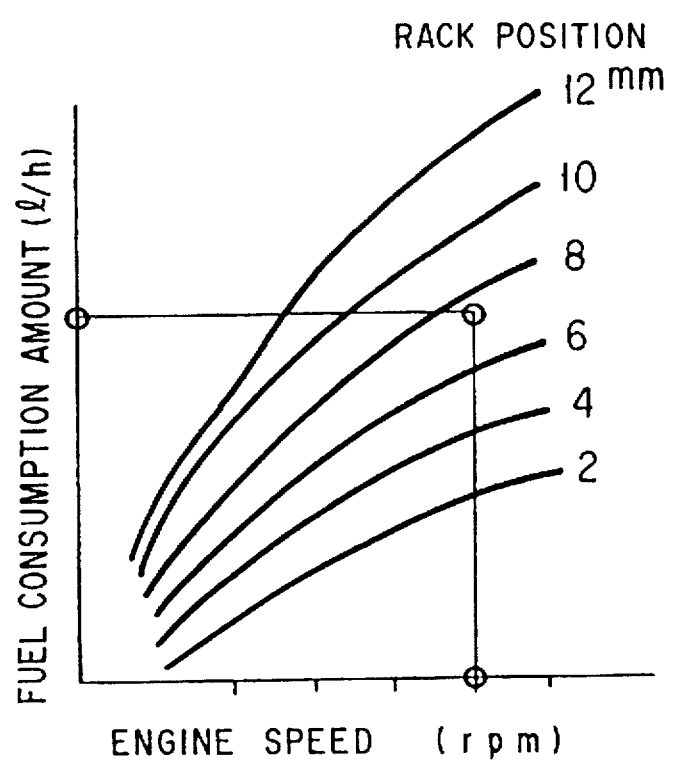
FIG. 6 is a chart showing a relationship between an engine speed and fuel consumption, which relationship is variable depending upon a rack position.

A throttle valve open angle (rack position) detected by the throttle open angle sensor 23 and an engine speed detected by the engine speed sensor 24 are input to a fuel consumption calculating portion 26 of the controller 14. Then, fuel consumption is calculated on the basis of the map in FIG. 6. The map shown in FIG. 6 shows a relationship between the engine speed and the fuel consumption which is variable depending upon the rack position.

Also, an operating period measured by the operating period timer 25 is input to the controller 14 to be used for calculation of a workload in a unit period together with the work load. Also, the operating period is used for calculating a fuel consumption within a unit period.

Calculated workload, unit period workload, fuel consumption and unit period fuel consumption are stored in the IC memory card 30, and in conjunction therewith, are printed by the printer 29 as data and/or displayed on a display 28.

It is also possible that by setting this IC memory card 30 in a personal computer in a management office, respective data may be input to the personal computer, then, by means of the personal computer, daily operation data and monthly operation data may be printed. This is advantageous in view of management the operation.

The daily operation data and the monthly operation data include the following data items:

time data, such as date, service meter (operation period gauge), operation start time, operation terminating time, operation period, inspection period, resting period for failure, stand-by state waiting period and so forth. Also, data such as production data, such as earth and sand amount per one bucket, number of times of loading, number of dumps by the dump truck, production grand total (earth and sand loading amount), consumption data, such as fuel consumption, oil consumption, disposable components, such as a filters and so forth, failure and history of maintenance, where the history of maintenance is input through the input key; and other such data, such as loading cycle period, a dump truck processing period and workload per unit amount of fuel.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

INDUSTRIAL APPLICABILITY

As set forth above, a workload detecting system of an excavating and loading apparatus is quite useful the operation management of a construction site.

We claim:

1. A workload detecting system to be used with an excavating and loading apparatus having a bucket support vertically pivoted relative to a vehicle body, a cylinder for vertically pivoting the bucket support and a bucket tiltable with respect to the bucket support, said workload detecting system comprising:

bottom pressure detecting means for detecting a bottom pressure of the cylinder for vertically pivoting the bucket support;

bucket position data detecting means for detecting bucket position data;

bucket position calculating means for calculating a bucket position on the basis of the bucket position data;

bucket weight calculating means for calculating a bucket weight on the basis of the detected bottom pressure and the bucket position; and bucket weight summing means for summing the bucket weight of a plurality of loaded buckets to determine the workload of the excavating and loading apparatus.

2. A workload detecting system to be used with an excavating and loading apparatus as claimed in claim 1, wherein the bucket weight calculating means includes a map of a relationship between the bucket weight and the detected bottom pressure of the cylinder, said relationship being variable depending upon the bucket position, and the bucket weight being corrected on the basis of said map and the bucket position.

3. A workload detecting system to be used with an excavating and loading apparatus as claimed in claim 2, which further comprises a tilt angle detecting means for detecting a tilt angle of the vehicle body, and wherein said bucket position calculating means corrects the calculated bucket position on the basis of the detected tilt angle of the vehicle body.

4. A workload detecting system to be used with an excavating and loading apparatus as claimed in claim 2, which further comprises a dump actuation detecting means for detecting actuation of a dumping of the bucket, and wherein said bucket weight calculating means calculates the bucket weight from an average value of the bottom pressure detected at timings slightly before and after a predetermined period from a given timing where said given timing is set at a given period ahead of a dump actuation detection signal input timing.

5. A workload detecting system to be used with an excavating and loading apparatus as claimed in claim 4, wherein said dump actuation detecting means generates said dump actuation detection signal when the bucket is positioned at a given height and pivoted over a given angle in a given direction.

6. A workload detecting system to be used with an excavating and loading apparatus as claimed in claim 1, which further comprises a calculation interruption signal input means for inputting a signal for interrupting calculation of the bucket weight.

7. A workload detecting system to be used with an excavating and loading apparatus as claimed in claim 1, which further comprises an IC memory card for having information relating to the bucket weight of the plurality of loaded buckets written thereto and read therefrom.

8. A workload detecting system to be used with an excavating and loading apparatus as claimed in claim 7, wherein said IC memory card further has time data and consumption data written thereto and read therefrom.

9. A workload detecting system to be used with an excavating and loading apparatus as claimed in claim 6, which further comprises an IC memory card for having information relating to the bucket weight of the plurality of loaded buckets written thereto and read therefrom.

10. A workload detecting system to be used with an excavating and loading apparatus as claimed in claim 9, wherein said IC memory card further has time data and consumption data written thereto and read therefrom.

11. A workload detecting system to be used with an excavating and loading apparatus as claimed in claim 1, wherein the bucket support includes a bucket cylinder and said bucket position data detecting means includes a stroke gauge positioned on the bucket cylinder where said stroke gauge detects a stroke of the bucket cylinder.

12. An assembly comprising an excavating and loading apparatus and a workload detecting system where said system is used for detecting the workload of the excavating and loading apparatus, said apparatus comprising:

a vehicle body, a boom pivotally supported by the body, an arm pivotally supported by the boom, a boom cylinder for driving the boom, a bucket tiltably mounted to the arm, and a bucket cylinder for tiltable operation of the bucket;

said workload detecting system comprising:

bottom pressure sensor for detecting a bottom pressure of the boom cylinder;

boom angle gauge;

arm angle gauge;

stroke gauge for detecting stroke of the bucket cylinder;

vehicle body tilt gauge;

bucket position calculating means for calculating a bucket position on the basis of said boom angle gauge, said arm angle gauge, said stroke gauge and said vehicle body tilt gauge;

bucket weight calculating means for calculating a bucket weight on the basis of the detected bottom pressure and the bucket position; and bucket weight summing means for summing the bucket weight of a plurality of loaded buckets to determine the workload of the excavating and loading apparatus.

13. An assembly comprising an excavating and loading apparatus and a workload detecting system as claimed in claim 12, wherein the bucket weight calculating means includes a map of a relationship between the bucket weight and the detected bottom pressure of the boom cylinder, said relationship being variable depending upon the bucket position, and the bucket weight being corrected on the basis of said map and the bucket position.

14. An assembly comprising an excavating and loading apparatus and a workload detecting system as claimed in claim 13, wherein said bucket position calculating means corrects the calculated bucket position on the basis of the detected tilt angle of the vehicle body.

15. An assembly comprising an excavating and loading apparatus and a workload detecting system as claimed in claim 13, which further comprises a dump actuation detecting means for detecting actuation of a dumping of the bucket, and wherein said bucket weight calculating means calculates the bucket weight from an average value of the bottom pressure detected at timings slightly before and after a predetermined period from a given timing where said given timing is set at a given period ahead of a dump actuation detection signal input timing.

16. An assembly comprising an excavating and loading apparatus and a workload detecting system as claimed in claim 15, wherein said dump actuation detecting means generates said dump actuation detection signal when the bucket is positioned at a given height and pivoted over a given angle in a given direction.

17. An assembly comprising an excavating and loading apparatus and a workload detecting system as claimed in claim 12, which further comprises a calculation interruption signal input means for inputting a signal for interrupting calculation of the bucket weight.

18. An assembly comprising an excavating and loading apparatus and a workload detecting system as claimed in claim 12, which further comprises an IC memory for having information relating to the bucket weight of the plurality of loaded buckets written thereto and read therefrom.

19. An assembly comprising an excavating and loading apparatus and a workload detecting system as claimed in claim 18, wherein said IC memory card further has time data and consumption data written thereto and read therefrom.

20. An assembly comprising an excavating and loading apparatus and a workload detecting system as claimed in claim 17, which further comprises an IC memory for having information relating to the bucket weight of the plurality of loaded buckets written thereto and read therefrom.

21. An assembly comprising an excavating and loading apparatus and a workload detecting system as claimed in claim 20, wherein said IC memory card further has time data and consumption data written thereto and read therefrom.

22. A workload detecting system to be used with an excavating and loading apparatus having a vehicle body, a boom pivotally supported by the body, an arm pivotally supported by the boom, a boom cylinder for driving the boom, a bucket tiltably mounted to the arm, and a bucket cylinder for tiltable operation of the bucket, said workload detecting system comprising:

bottom pressure sensor for detecting a bottom pressure of the boom cylinder;

boom angle gauge;

arm angle gauge;

stroke gauge for detecting stroke of the bucket cylinder;

vehicle body tilt gauge;

bucket position calculating means for calculating a bucket position on the basis of said boom angle gauge, said arm angle gauge, said stroke gauge and said vehicle body tilt gauge;

bucket weight calculating means for calculating a bucket weight on the basis of the detected bottom pressure and the bucket position; and bucket weight summing means for summing the bucket weight of a plurality of loaded buckets to determine the workload of the excavating and loading apparatus.

23. A workload detecting system to be used with an excavating and loading apparatus as claimed in claim 22, wherein said bucket weight calculating means includes a map of a relationship between the bucket weight and the detected bottom pressure of the boom cylinder;

said relationship being variable depending upon the bucket position; and the bucket weight being corrected on the basis of said map and the bucket position.

24. A workload detecting system to be used with an excavating and loading apparatus as claimed in claim 23, wherein said bucket position calculating means corrects the calculated bucket position on the basis of the detected tilt angle of the vehicle body.

25. A workload detecting system to be used with an excavating and loading apparatus as claimed in claim 23, which further comprises a dump actuation detecting means for detecting actuation of a dumping of the bucket, and wherein said bucket weight calculating means calculates the bucket weight from an average value of the bottom pressure detected at timings slightly before and after a predetermined period from a given timing where said given timing is set at a given period ahead of a dump actuation detection signal input timing.

26. A workload detecting system to be used with an excavating and loading apparatus as claimed in claim 25, wherein said dump actuation detecting means generates said dump actuation detection signal when the bucket is positioned at a given height and pivoted over a given angle in a given direction.

27. A workload detecting system to be used with an excavating and loading apparatus as claimed in claim 22, which further comprises a calculation interruption signal input means for inputting a signal for interrupting calculation of the bucket weight.

28. A workload detecting system to be used with an excavating and loading apparatus as claimed in claim 22, which further comprises an IC memory card for having information relating to the bucket weight of the plurality of loaded buckets written thereto and read therefrom.

29. A workload detecting system to be used with an excavating and loading apparatus as claimed in claim 28, wherein said IC memory card further has time data and consumption data written thereto and read therefrom.

30. A workload detecting system to be used with an excavating and loading apparatus as claimed in claim 27, which further comprises an IC memory card for having information relating to the bucket weight of the plurality of loaded buckets written thereto and read therefrom.

31. A workload detecting system to be used with an excavating and loading apparatus as claimed in claim 32 wherein said IC memory card further has time data and consumption data written thereto and read therefrom.

32. An assembly comprising an excavating and loading apparatus and a workload detecting system where said system is used for detecting the workload of the excavating and loading apparatus, said apparatus comprising:

a vehicle body, a boom pivotally supported by the body, an arm pivotally supported by the boom, a boom cylinder for driving the boom, a bucket tiltably mounted to the arm, and a bucket cylinder for tiltable operation of the bucket;

said workload detecting system comprising:

bottom pressure detecting means for detecting a bottom pressure of the boom cylinder;

bucket position data detecting means for detecting bucket position data;

bucket position calculating means for calculating a bucket position on the basis of the bucket position data;

bucket weight calculating means for calculating a bucket weight on the basis of the detected bottom pressure and the bucket position; and bucket weight summing means for summing the bucket weight of a plurality of loaded buckets to determine the workload of the excavating and loading apparatus.

33. An assembly comprising an excavating and loading apparatus and a workload detecting system as claimed in claim 32, wherein said bucket weight calculating means includes a map of a relationship between the bucket weight and the detected bottom pressure of the boom cylinder;

said relationship being variable depending upon the bucket position; and the bucket weight being corrected on the basis of said map and the bucket position.

34. An assembly comprising an excavating and loading apparatus and a workload detecting system as claimed in claim 33, which further comprises a tilt angle detecting means for detecting a tilt angle of the vehicle body, and wherein said bucket position calculating means corrects the calculated bucket position on the basis of the detected tilt angle of the vehicle body.

35. An assembly comprising an excavating and loading apparatus and a workload detecting system as claimed in claim 33, which further comprises a dump actuation detecting means for detecting actuation of a dumping of the bucket, and wherein said bucket weight calculating means calculates the bucket weight from an average value of the bottom pressure detected at timings slightly before and after a predetermined period from a given timing where said given timing is set at a given period ahead of a dump actuation detection signal input timing.

36. An assembly comprising an excavating and loading apparatus and a workload detecting system as claimed in claim 35, wherein said dump actuation detecting means generates said dump actuation detection signal when the bucket is positioned at a given height and pivoted over a given angle in a given direction.

37. An assembly comprising an excavating and loading apparatus and a workload detecting system as claimed in claim 32, which further comprises a calculation interruption signal input means for inputting a signal for interrupting calculation of the bucket weight.

38. An assembly comprising an excavating and loading apparatus and a workload detecting system as claimed in claim 32, which further comprises an IC memory card for having information relating to the bucket weight of the plurality of loaded buckets written thereto and read therefrom.

39. An assembly comprising an excavating and loading apparatus and a workload detecting system as claimed in claim 38, wherein said IC memory card further has time data and consumption data written thereto and read therefrom.

40. A workload detecting system to be used with an excavating and loading apparatus as claimed in claim 37, which further comprises an IC memory card for having information relating to the bucket weight of the plurality of loaded buckets written thereto and read therefrom.

41. An assembly comprising an excavating and loading apparatus and a workload detecting system as claimed in claim 40, wherein said IC memory card further has time data and consumption data written thereto and read therefrom.

42. An assembly comprising an excavating and loading apparatus and a workload detecting system as claimed in claim 32, wherein said bucket position data detecting means includes a stroke gauge positioned on the bucket cylinder where said stroke gauge detects a stroke of the bucket cylinder.

* * * * *